UNITED STATES PATENT OFFICE.

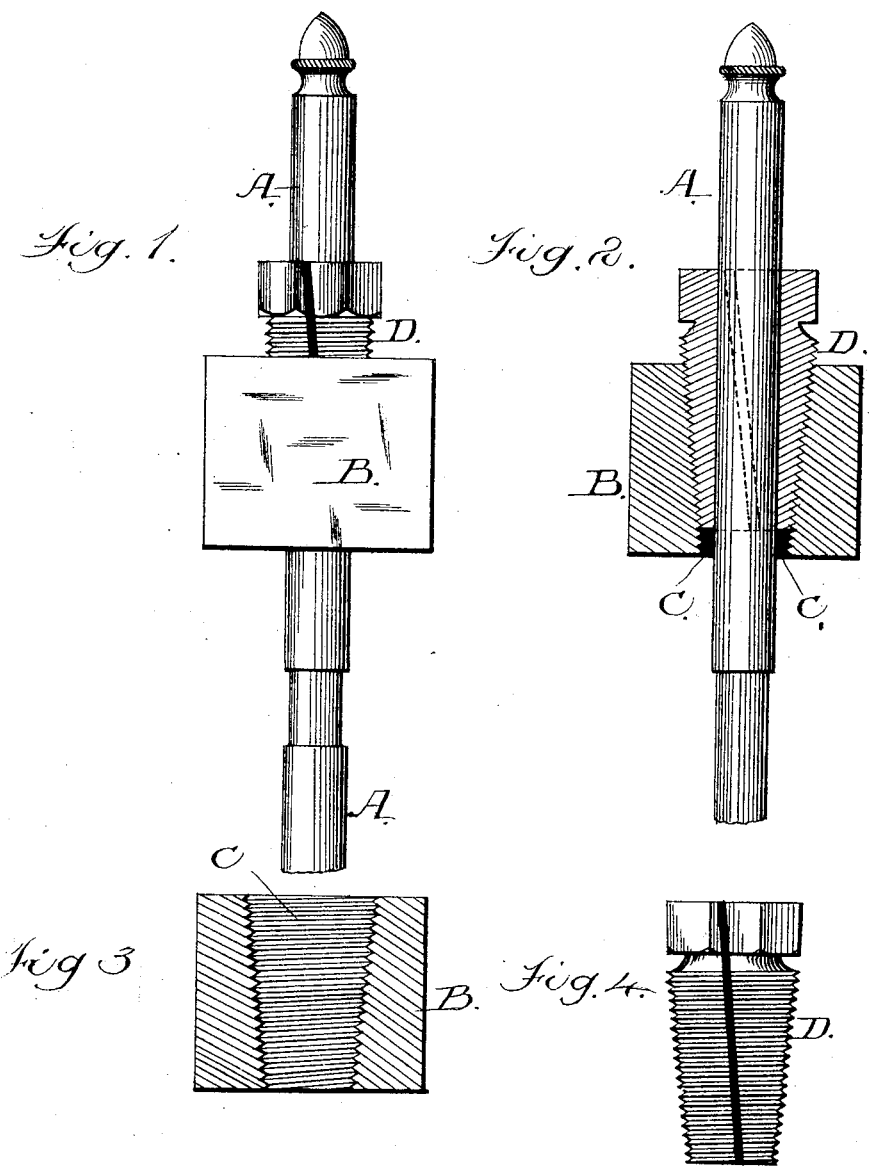

CHARLES E. TIBBLES, OF BURLINGTON, IOWA.

JOURNAL-BEARING.

SPECIFICATION forming part of Letters Patent No. 275,292, dated April 3, 1883.

Application filed March 5, 1883. (No model.)

*To all whom it may concern:*

Be it known that I, CHARLES E. TIBBLES, of Burlington, county of Des Moines, State of Iowa, have invented certain new and useful Improvements in Journal-Bearings, of which the following is a clear, full, and exact description, reference being had to the accompanying drawings, making a part of this specification, in which—

Figure 1 shows the side elevation of a journal-bearing with my improvements attached. Fig. 2 is a longitudinal section of the same. Fig. 3 is the same view of the bearing with the bushing removed. Fig. 4 is a detached view of the bushing.

The object of my invention is to compensate for the wear of journals and bushings, and at the same time maintain a perfectly concentric and substantial bearing or bushing; and it consists in the construction of the bushing and the opening in the bearing, whereby the bushing may be readily contracted to fit the journal as the parts wear away.

To enable others skilled in the art to make and use my invention, I will proceed to describe the exact manner in which I have carried it out.

In the drawings, A represents the journal or shafting, having its bearings B formed in the usual way. The hole or opening C through the bearing is made slightly conical in shape and screw-threaded, and into this opening fits a conical-shaped split bushing, D, also screw-threaded, as shown in Fig. 2. It is evident that as this split bushing is screwed into the bearing the central opening in the bushing is contracted to compensate for the wear. As the wear of the journal would produce a shoulder on it, against which the bushing would necessarily come in contact and prevent the bushing from moving up the incline of the conical opening in the bearing, to overcome this difficulty I cut away or slightly reduce the diameter of a revolving journal from a point under the small end of the conical bushing, and thus avoid the forming of a shoulder by the wear, or if a reciprocating journal the reduced diameter would be from and beyond the point of wear.

I am aware that a conical split bushing has been used with a corresponding screw-threaded conical nut, together fitting in a straight opening in the bearing, whereby the wear was taken up by means of the nut; but this construction involved the use of a screw-threaded nut, which is objectionable, and which it is the object of my invention to dispense with, and thus materially lessen the expense and cost of construction.

Having thus explained my invention, what I claim as new, and desire to secure by Letters Patent, is—

The conical split bushing D, screw-threaded as described, in combination with the bearing B, provided with a conical-shaped screw-threaded opening to receive the said bushing, substantially as and for the purpose set forth.

CHARLES E. TIBBLES.

Witnesses:
H. B. APPLEWHAITE,
T. WALTER FOWLER.